United States Patent
Miller et al.

(10) Patent No.: US 6,338,016 B1
(45) Date of Patent: Jan. 8, 2002

(54) METHOD AND APPARATUS FOR DETECTING A MOTOR STALL CONDITION IN AN ELECTRIC ASSIST STEERING SYSTEM

(75) Inventors: Joseph D. Miller, Farmington Hills, MI (US); Ivan J. Williams, Rolling Hills, CA (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/264,596

(22) Filed: Mar. 8, 1999

(51) Int. Cl.$^7$ .............................. G06F 17/00; G05D 1/00
(52) U.S. Cl. .................... 701/43; 701/41; 180/443; 180/446; 318/471; 361/24; 361/25
(58) Field of Search .............................. 701/41, 42, 43; 180/442, 443, 446, 421; 318/432, 434, 254, 599, 811, 471; 74/388 PS; 388/923, 930, 934, 910, 915; 361/23, 24, 25

(56) References Cited

U.S. PATENT DOCUMENTS

| | | | |
|---|---|---|---|
| 4,532,567 A | | 7/1985 | Kade .............................. 361/31 |
| 4,611,682 A | * | 9/1986 | Yasuda et al. ............... 180/446 |
| 4,660,671 A | | 4/1987 | Behr et al. .................... 180/446 |
| 4,789,040 A | * | 12/1988 | Morishita et al. |
| 4,834,201 A | | 5/1989 | Miyazaki et al. .......... 180/79.1 |
| 4,837,690 A | * | 6/1989 | Morishita et al. ............. 701/43 |
| 4,849,889 A | * | 7/1989 | Morishita et al. ............. 701/41 |
| 4,878,004 A | | 10/1989 | Shimizu ....................... 318/599 |
| 4,961,033 A | | 10/1990 | Hirota ......................... 318/560 |
| 4,977,507 A | | 12/1990 | Matsuoka et al. ............. 701/43 |
| 5,072,166 A | | 12/1991 | Ehsani ........................ 318/696 |
| 5,097,918 A | | 3/1992 | Daido et al. ................... 701/41 |
| 5,257,828 A | | 11/1993 | Miller et al. ................. 180/446 |
| 5,517,415 A | | 5/1996 | Miller et al. ................... 701/43 |
| 5,623,409 A | * | 4/1997 | Miller ........................... 701/41 |
| 5,761,627 A | * | 6/1998 | Seidel et al. .................. 701/41 |
| 5,810,111 A | * | 9/1998 | Takeuchi et al. ............. 180/443 |
| 5,967,253 A | * | 10/1999 | Collier-Hallman .......... 180/421 |
| 6,008,599 A | * | 12/1999 | Beck ............................ 318/254 |

FOREIGN PATENT DOCUMENTS

| | | |
|---|---|---|
| JP | 399981 | 4/1991 |
| JP | 8127351 | 5/1996 |

* cited by examiner

Primary Examiner—Jacques H. Louis-Jacques
(74) Attorney, Agent, or Firm—Tarolli, Sundheim, Covell, Tummino & Szabo L.L.P.

(57) ABSTRACT

A vehicle electric assist steering system (10) includes a switching circuit (56) for providing electrical power to an electric motor (52) of the vehicle steering system. The switching circuit (56) has a temperature condition. A temperature sensor (69) is coupled with the switching circuit (56) for providing an output signal (71) having a value indicative of the temperature condition of the switching circuit (56). A stall detector (70) is responsive to the output signal (71). The stall detector (70) is operable to reduce power to the electric motor to different level during a stall condition based on the sensed temperature condition of the switching circuit (56).

18 Claims, 3 Drawing Sheets

METHOD AND APPARATUS FOR DETECTING A MOTOR STALL CONDITION IN AN ELECTRIC ASSIST STEERING SYSTEM

BACKGROUND OF THE INVENTION

1. Field of the Invention

The present invention is directed to an electric assist steering system, and, more particularly, to a method and apparatus for detecting a motor stall condition in an electric assist steering system.

2. Description of Related Art

Electric assist steering systems are well known in the art. In such electric assist steering systems, an electric assist motor, when energized, provides torque assist to aid the driver in turning steerable wheels of the vehicle. The electric assist motor is typically controlled in response to both steering torque applied to the vehicle steering wheel and measured vehicle speed. A controller monitors steering torque and controls a drive circuit to, in turn, control current applied to the electric assist motor. Such drive circuits typically include field effect transistors (FET's) or other forms of solid state switches operatively coupled between the vehicle battery and the electric assist motor. Current is controlled by pulse width modulation of the FET's or switches.

If steering torque is applied and the steerable wheels are held immovable, such as when the wheels are against a curb, the temperature of both the electric assist motor and the FET's rise. Such a condition is referred to as a stall condition of the electric assist motor. If the stall condition lasts for an extended period, the motor and/or FET's can overheat and fail.

U.S. Pat. No. 5,517,415 to Miller, which is assigned to TRW, Inc., discloses a stall detection apparatus for an electric assist steering system. A stall detector controls electrical current which is supplied to the electric motor in response to detecting the occurrence of a stall condition. This prevents damage to both the motor and drive circuitry.

U.S. Pat. No. 4,532,567 to Kade discloses an electric assist steering system which measures actual current through the motor. If the measured current exceeds a limit, the motor drive current is reduced.

U.S. Pat. No. 5,097,918 to Daido et al. discloses an electric assist steering system that includes an electric assist motor connected to a steering mechanism through an electromagnetic clutch. The system further includes a sensor for sensing rotational motion of the electric assist motor. When torque is sensed and the rotary sensor indicates that the motor is not rotating, the system disengages the electromagnetic clutch.

U.S. Pat. No. 4,878,004 to Shimizu discloses an electric assist steering system that includes an electric assist motor and a controller for controlling operation of the motor. The system further includes a current sensor which senses the magnitude of the actual current through the electric assist motor. An average value motor current is determined. The motor is controlled in response to the determined average current value.

SUMMARY OF THE INVENTION

The present invention is directed to an apparatus for detecting a stall condition of an electric assist motor in a vehicle steering system. The apparatus includes a switching circuit for providing electrical power to the electric motor of the vehicle steering system. The switching circuit has a temperature condition. A temperature sensor is coupled with the switching circuit and provides an output signal having a value indicative of the temperature condition of the switching circuit. A stall detector is responsive to the output signal of the temperature sensor. Specifically, the stall detector is operable to reduce power to the electric motor to a first level based on motor commutation and to a second level (i) based on motor commutation and (ii) upon determining the temperature condition of the switching circuit is greater than or equal to a first temperature threshold.

Another aspect of the present invention is directed to a method detecting a stall condition of an electric assist motor in a vehicle steering system. The method includes providing electric power to the electric assist motor of the vehicle steering system through a switching circuit. A temperature condition of the switching circuit of the system is monitored and an output signal indicative of the temperature condition is provided. The temperature condition of the switching circuit is determined in response to the output signal. Upon determining a stall condition, a stall detector is enabled to reduce power to the electric motor to first level through the switching circuit. Upon determining the temperature condition of the switching circuit is greater than or equal to a first temperature threshold during a stall condition, the stall detector reduces power to the electric motor to a second level which is different from the first level. Preferably, the second level of power reduction is functionally related to the temperature condition of the switching circuit.

BRIEF DESCRIPTION OF THE DRAWINGS

Other features and advantages of the present invention will become apparent to those skilled in the art to which the present invention relates from a reading of the following detailed description with reference to the accompanying drawings, in which.

DETAILED DESCRIPTION

Figure 1:
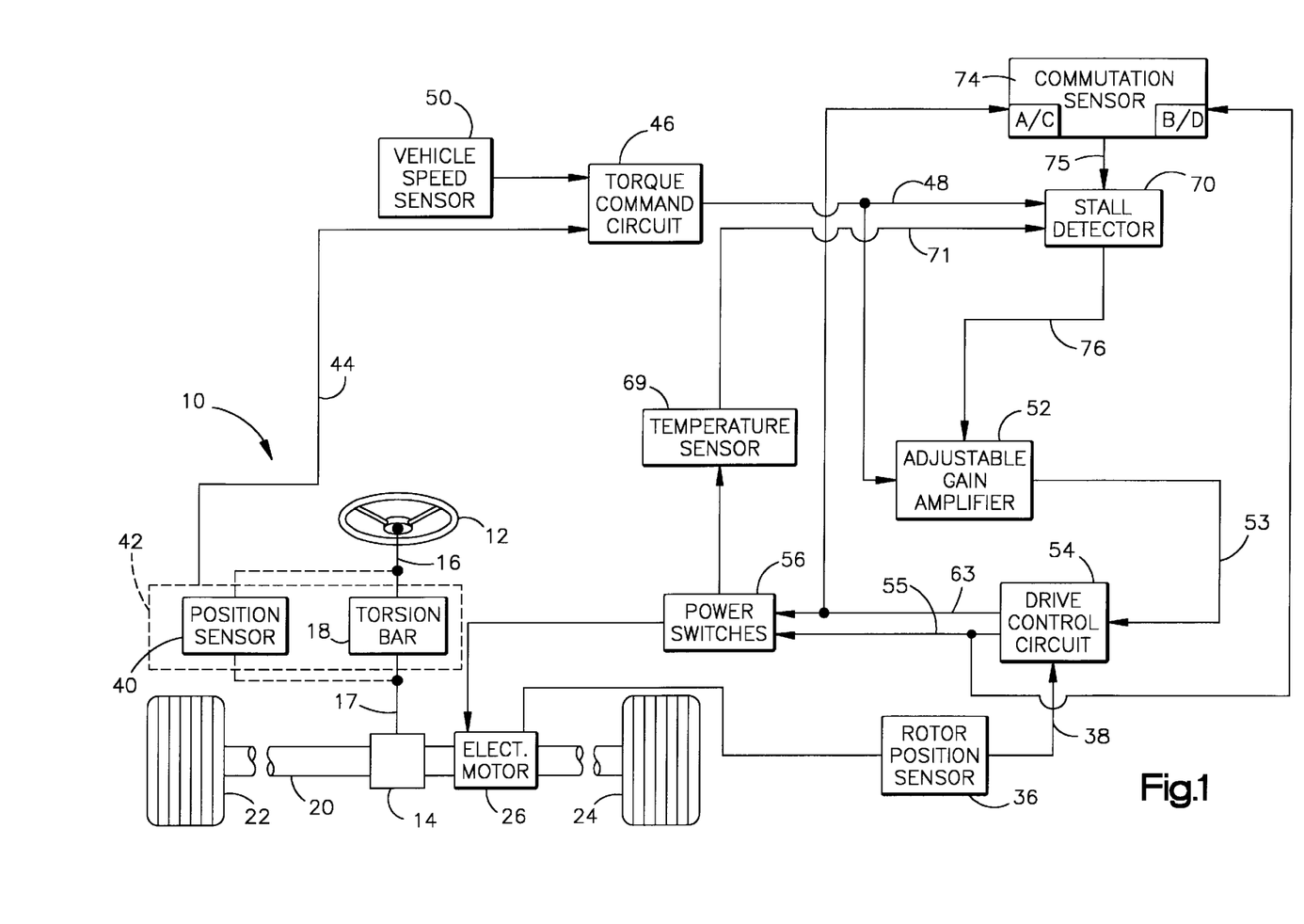
FIG. 1 is a block diagram illustrating an electric assist steering system made in accordance with the present invention.

FIG. 1 illustrates a preferred embodiment of a vehicle electric assist steering system 10 in accordance with the present invention. The system 10 includes a vehicle steering wheel 12 connected to an input shaft 16 and a pinion gear 14 connected to a pinion shaft 17. The input shaft 16 is coupled to the pinion shaft 17 through a torsion bar 18. The torsion bar 18 twists in response to torque applied to the vehicle steering wheel 12 to permit relative rotation between the input shaft 16 and the pinion shaft 17. Stops, not shown, limit the amount of relative rotation between the input shaft 16 and the pinion shaft 17 in a manner known in the art.

The pinion gear 14 has a set of helical gear teeth (not shown) which meshingly engage a set of straight cut gear teeth (not shown) on a linear steering member or rack 20. The rack 20 is coupled to vehicle steerable wheels 22, 24 with steering linkage in a known manner. The pinion gear 14 together with the rack 20 forms a rack and pinion gear set. When the steering wheel 12 is turned, the rack and pinion gear set converts the rotary motion of the steering wheel into linear motion of the rack 20. When the rack 20 moves linearly, the steerable wheels 22 and 24 pivot about their associated steering axis and the vehicle is steered.

An electric assist motor 26 is drivingly connected with the rack 20 through, preferably, a ball-nut drive arrangement (not shown). It will be understood and appreciated that the apparatus and method of the present invention are equally applicable to other types of drive arrangements. The motor 26, when energized, provides assist to aid in steering movement of the rack 20. In a preferred embodiment of the present invention, the motor 26 is a variable reluctance motor. A variable reluctance motor is preferred because of its relatively small size, low friction, and high torque-to-inertia ratio.

The motor 26 includes a stator 28 (FIG. 2) having a plurality of stator poles 30. Associated with each stator pole 30 is a stator coil (not shown) wrapped around the stator pole. The motor 26 also includes a rotor 32 having a plurality of rotor poles 34. In the preferred embodiment, the motor 26 is a four phase motor which includes eight stator poles 30 and six rotor poles 34.

The stator poles 30 are arranged so as to be energized in pairs designated Aa, Bb, Cc, and Dd. When a pair of stator poles 30 is energized, the rotor 32 moves so as to minimize the reluctance between the energized stator poles and the rotor poles 34. Minimum reluctance occurs when a pair of rotor poles 34 is aligned with the energized stator poles 30. For example, in the position of the motor 26 illustrated in FIG. 2, there is minimum reluctance between the pair of stator poles Aa and the rotor poles 34 which are aligned with the stator poles Aa. Once minimum reluctance is achieved, as determined by the relative position of the rotor and stator, the energized stator poles 30 are de-energized and an adjacent pair of stator poles is energized to continue to cause rotation of the rotor 32.

The direction of rotation of the rotor 32 is controlled by the sequence in which the stator poles 30 are energized. For example, to rotate the rotor 32 clockwise from its position in FIG. 2, the stator pole pair Dd is next energized. To rotate the rotor 32 counterclockwise from the position illustrated in FIG. 2, the stator pole pair Bb is next energized.

Figure 2:
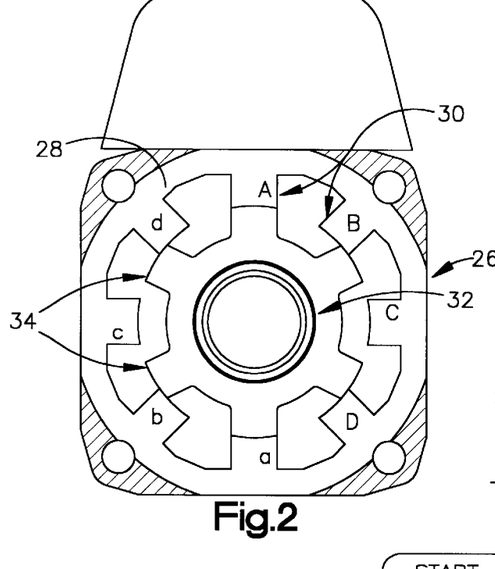
FIG. 2 is a cross-sectional view of the electric assist motor shown in FIG. 1.

The torque produced by the motor 26 is controlled by the amount of current through the stator coils. A preferred manner for controlling a variable reluctance motor so as to control motor torque and direction is fully disclosed in U.S. Pat. No. 5,257,828 to Miller et al., and assigned to TRW Inc., the disclosure of which is fully incorporated herein by reference.

As illustrated in FIG. 1, a rotor position sensor 36 senses the position of the rotor 32 relative to the stator 28 and provides a rotor position signal 38 indicative of that relative position. In the preferred embodiment, the rotor position sensor 36 is a discrete sensor. It is contemplated that, alternatively, operating parameters of the motor 26 can be used to sense rotor position. For example, rotor position can be determined by monitoring the current through the stator coils associated with unenergized stator poles 30. One suitable arrangement for sensing rotor position without a discrete sensor is disclosed in U.S. Pat. No. 5,072,166, which is incorporated herein by reference.

Referring back to FIG. 1, a shaft position sensor 40 is connected with the input shaft 16 and the output shaft 17. The shaft position sensor 40 in combination with the torsion bar 18 forms a torque sensor indicated schematically at 42. The shaft position sensor 40 provides a signal 44 indicative of the relative rotational position between the input shaft 16 and the output shaft 17. The relative rotational position between the input shaft 16 and the output shaft 17 is indicative of the steering torque applied by the vehicle operator to the vehicle steering wheel 12. Therefore, the output signal 44 of the shaft position sensor 40 is indicative of the steering torque applied to the vehicle steering wheel 12 and is referred to as the applied steering torque signal.

The applied steering torque signal 44 is connected to a torque command circuit 46. The torque command circuit 46 determines the assist torque desired from the motor 26. The assist torque determined by the torque command circuit 46 is a function of two parameters: (i) the value of the applied steering torque signal 44, and (ii) vehicle speed. A vehicle speed sensor 50 provides a vehicle speed signal to the torque command circuit 44 indicative of the vehicle speed. Typically, the amount of torque assist desired from the motor 26 decreases as vehicle speed increases. This is referred to in the art as speed proportional steering.

The torque command circuit 46 provides a torque command signal 48 indicative of the torque assist value which is desired from the assist motor 26. The torque command signal 48 is output to an adjustable gain amplifier 52. The adjustable gain amplifier 52 amplifies the torque command signal 48 and outputs an amplified torque command signal 53.

The amplified torque command signal 53 is connected to a drive control circuit 54. Preferably, the drive control circuit 54 is a microprocessor or microcomputer. Alternatively, the drive control circuit 54 may be an integrated circuit or part of a larger control circuit configured to control the electric assist motor 26. The rotor position signal 38 is also connected to the drive control circuit 54. The drive control circuit 54 utilizes the amplified torque command signal 53 and the rotor position signal 38 to determine the required motor energization current and motor energization sequence to achieve the requested steering direction. The drive control circuit 54 outputs motor control signals 55 and 63 to a set of power switches 56. The motor control signals 55 and 63 control which stator pole pair (i.e., Aa, Bb, Cc, or Dd) or pairs are energized and also control the energization current. Although a pair of control lines 55 and 63 is shown, each pole pair typically has its own associated control line, i.e., there are four control lines between the drive control circuit 54 and the power switches 56. It will be appreciated that the apparatus and method of the present invention also is applicable to other drive control and power switching arrangements, such as where each stator pole pair is controlled by two or more power switches.

The power switches 56 are pulse width modulated to control the motor current. To ensure smooth operation of the motor 26, the position of the rotor 30 can be estimated at predetermined times between actual rotor position measurements. This estimation is made on the basis of certain known conditions and certain assumptions. Suitable methods of rotor position estimation are described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A. Lumsdaine, J. H. Lang, and M. J. Balas, 19th ASILOMAR Conference on Circuits, Systems & Computers, Nov. 6–8, 1985. The disclosures of both of these papers are incorporated herein by reference.

Figure 3:
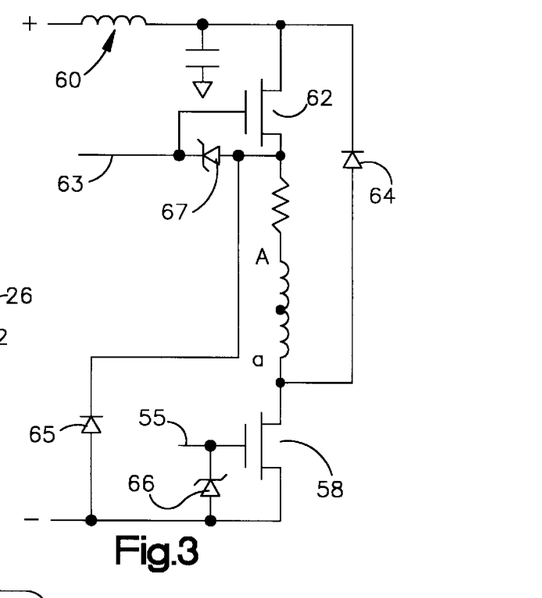
FIG. 3 is a circuit schematic diagram of a portion of the power switches shown in FIG. 1.

FIG. 3 illustrates a power switch circuit of the power switches 56 associated with one stator coil pair Aa. One side of the stator coil Aa is connected to electrical ground through a main drive switch 58. The other side of the stator coil Aa is connected to the vehicle battery through a switch 62 and an LC filter network 60. The drive control circuit 54 (FIG. 1) outputs the motor control signals 55 and 63 to the control terminal of the switch 58 and switch 62, respectively. The motor control signals 55 and 63 are pulse width modulated by the drive control circuit 54 to control the current through the stator coil pair Aa. Diodes 64 and 65 provide fly-back current control. Zener diodes 66 and 67 provide over voltage protection.

Referring back to FIG. 1, the motor 26 is energized through control of the switches 56 to cause the rotor 32 to rotate in the desired direction with the desired torque. Rotation of the rotor 32 results in linear movement of the rack 20. Linear movement of the rack 20 results in turning of the vehicle steerable wheels 22 and 24 to steer the vehicle.

To detect a motor stall condition for the purpose of preventing overheating of the motor 26 or the solid state switches 58 and 62 in the switch circuit 56, the system 10 includes a stall detector 70. The stall detector 70 is operative to control the amount of electrical power being supplied to the electric motor 26 by the power switches 56 in response to a motor stall condition.

A temperature sensor 69 is coupled with the switches 56 for detecting a temperature condition of the switches. The temperature sensor 69 provides an output signal 71 to the stall detector 70 which has a value indicative of the temperature condition of the switches 56. The stall detector 70 continually monitors the temperature of the switches 56 through the output signal 71 from the temperature sensor 69.

The stall detector 70 is responsive to the temperature condition of the switches 56. In particular, the action provided by the stall detector 70 during the existence of a stall condition varies as a function of the switch temperature condition.

The operation of the stall detector 70, i.e., whether it is enabled or disabled, also may be contingent upon temperature. For example, when the temperature condition of the switches 56 is greater than or equal to a first predetermined threshold temperature, the stall detector 70 is enabled. Conversely, the stall detector 70 is disabled when the temperature condition of the switches 56 is less than the first temperature threshold.

Preferably, when the stall detector 70 is enabled, such as may be based on switch temperature, and a stall condition is detected, the stall detector 70 is operative to reduce electrical power to the motor 26 to a first level. Further, upon determining the existence of a stall condition and upon determining the temperature condition of the switches 56 is greater than the first threshold but less than a second threshold, the stall detector 70 is effective to reduce electrical power to a second level. The second level is different and preferably lower than the first operative level. If the temperature condition of the switches is equal to or exceeds the second temperature threshold, the stall detector 70 is operative to reduce the power applied to the motor to yet a different third level. Illustrative examples of the stall detector 70 controlling the electrical power supplied to the electric motor 26 follow.

Provided the stall detector 70 is enabled, it determines whether a stall condition exists. The stall detector 70 uses, in accordance with one embodiment of the present invention, two parameters in determining whether the motor 26 is in a stall condition. The first parameter is the value of the torque command signal 48. When the torque command signal 48, which is indicative of the assist torque desired from the motor 26, is less than a threshold value $T_{min}$, the amount of torque desired from the motor is between zero and a relatively small value. If the current through the motor is less than a predetermined amount, damage to either the switches 56 or motor 26 is not possible. Therefore, in such a case, the stall detector 70 determines that a stall condition cannot exist. When the stall detector 70 determines that the torque command signal 48 is greater than the threshold $T_{min}$, a stall condition may exist. In such a case, the stall detector 70 considers the second parameter.

The second set of parameters used by the stall detector 70 in detecting a motor stall is (i) whether or not the motor is commutating and (ii) the duration between motor commutations.

A commutation sensor 74 is connected to each of the outputs 55 and 63 of the drive control circuit 54 and to the stall detector circuit 70. The outputs 55 and 63 of the drive control circuit 55 indicate to the commutation sensor 74 which stator pole pair or pairs are energized. The commutation sensor 74 monitors the motor control signals 55 and 63 and uses these signals to determine the duration for which a stator pole pair or pairs is energized. The commutation sensor 74 includes two timers, designated A/C and B/D. The A/C timer measures the time period for which the stator pole pairs Aa or Cc are energized. The B/D timer measures the time period for which the stator pole pairs Bb or Dd are energized.

For example, when the motor control signal 55 indicates that the stator pole pair Aa is energized, the A/C timer begins measuring the time period for which the stator pole pair Aa remains energized (i.e., continues to be pulse width modulated so that current flows through the Aa motor windings). The A/C timer continues measuring until the stator pole pair Aa is deenergized (i.e., current flow discontinues). The commutation sensor 74 outputs a commutation signal 75 to stall detector 70 having a value indicative of the time period for which the stator pole pair Aa has been energized. If two stator pole pairs are energized simultaneously (e.g., Aa and Bb, or Aa and Dd), the commutation sensor outputs signals to the stall detector 70 indicating which stator pole pairs are energized and the time period of energization of each stator pole pair, i.e., both timers A/C and B/D would be counting or measuring.

In a variable reluctance motor, it is possible to simultaneously energize adjacent pole pairs. Such an approach reduces torque ripple, as is known in the art. However, pole pairs Aa and Cc are never energized together and pole pairs Bb and Dd are never energized together. Therefore, the commutation sensor 74 only requires two timers, i.e., the A/C timer and the B/D timer.

The stall detector 70 monitors the commutation signal 75 to determine the period of time for which each of the stator pole pairs is energized. The stall detector 70 determines whether the same stator pole pair or pairs have been energized for greater than a predetermined period of time. If such a determination is affirmative, it is determined that no motor commutation is occurring.

If the stall detector 70 determines that both (i) the same stator pole pair or pairs has been energized for greater than the predetermined time, and (ii) the torque command signal is greater than the threshold $T_{min}$, then a stall condition exists. When the stall detector 70 is enabled and determines that a stall condition exists, it outputs a control signal 76 to the adjustable gain amplifier 52 to adjust the gain of the adjustable gain amplifier so as to protect the motor 26 and the power switches 56.

The gain $G_{tot}$ of the adjustable gain amplifier 52, in accordance with one embodiment of the present invention, can be set to one of at least three relative values, preferably based upon stall time: (1) a minimum gain $G_{min}$; (2) an intermediate gain $G_{int}$; and (3) a normal gain $G_{norm}$. When the gain of the adjustable gain amplifier 52 is at the minimum gain level $G_{min}$, the gain of the adjustable gain amplifier 52 is at its lowest value so as to minimize the current to the motor 26, which reduces electrical power to the motor. This low gain value will. minimize the possibility of overheating of the motor and switches 56. When the gain of the adjustable gain amplifier 52 is at the intermediate gain level $G_{int}$, an intermediate amount of current is provided to the motor 26. When the gain of the adjustable gain amplifier 52 is at the normal gain level $G_{norm}$, the gain of the adjustable gain amplifier 52 is at its greatest value at which the drive control circuit 54 can provide a desired amount of current to the motor 26. In this way, when a stall condition is determined to exist, the stall detector 70 can limit the torque demanded from the motor 26 to prevent motor damage and damage to the switches 56.

In accordance with the present invention, the gain value $G_{tot}$ is controlled so as to be functionally related to both the temperature (T) of the power switches 56 and the extent of the stall condition as described above. Preferably, the stall detector 70 determines a gain value term $G_{temp}$ in response to the output signal 71 of the temperature sensor 69. The $G_{temp}$ value is used to make the gain of the amplifier 52 functionally related to the temperature condition of the power switches 56. The total gain $G_{tot}$ applied by the gain amplifier 52 may be expressed as a function of $G_{temp}$ (i.e., gain term from sensed switch temperature) and the appropriate gain value $G_{norm}$, $G_{low}$ or $G_{int}$ (i.e., gain term as a result of the extent of the stall condition), namely:

$$G_{tot} = G_{temp} * G_{low};$$

or $$G_{tot} = G_{temp} * G_{int};$$

or $$G_{tot} = G_{temp} * G_{norm}.$$

The gain term resulting from the stall condition (i.e., $G_{low}$, $G_{int}$, $G_{norm}$) can be collectively referred to as $G_{st}$. Therefore:

$$G_{tot} = G_{temp} * G_{st}$$

Preferably, the stall detector 70 adjusts the stall detector temperature gain term $G_{temp}$ of amplifier 52 according to the following equations:

$$G_{temp} = 1, \text{ where } T < 123° \text{ C.}$$
$$= -0.010136 * T + 2.255, \text{ where } 123° \text{ C.} \leq T < 128° \text{ C. and}$$
$$= -0.029926 * T + 4.788, \text{ where } T \geq 128° \text{ C.}$$

It will be apparent to those skilled in the art that when the temperature is less than the threshold temperature of 123° C., the $G_{temp}$ value is at about unity gain. As the temperature increases above the threshold temperature, the $G_{temp}$ value decreases to a value less than unity and approaches zero at high temperatures. This results in further decreasing the amount of electric power supplied to the electric motor 52.

The stall detector 70 thus provides three variable levels of gain control based on the temperature of the power switches.

The first level is unity gain. A second temperature threshold, such as about 128° C., establishes which variable level will be used for the temperature gain term $G_{temp}$. In addition to the temperature-dependent operation of the gain amplifier 52, the total gain value $G_{tot}$ of the stall detector 70 is also responsive to the occurrence of a stall condition term. As stated above, it is also possible to condition operation of the stall detector 70 upon the switch temperature condition exceeding the initial switch temperature threshold.

Figure 4:
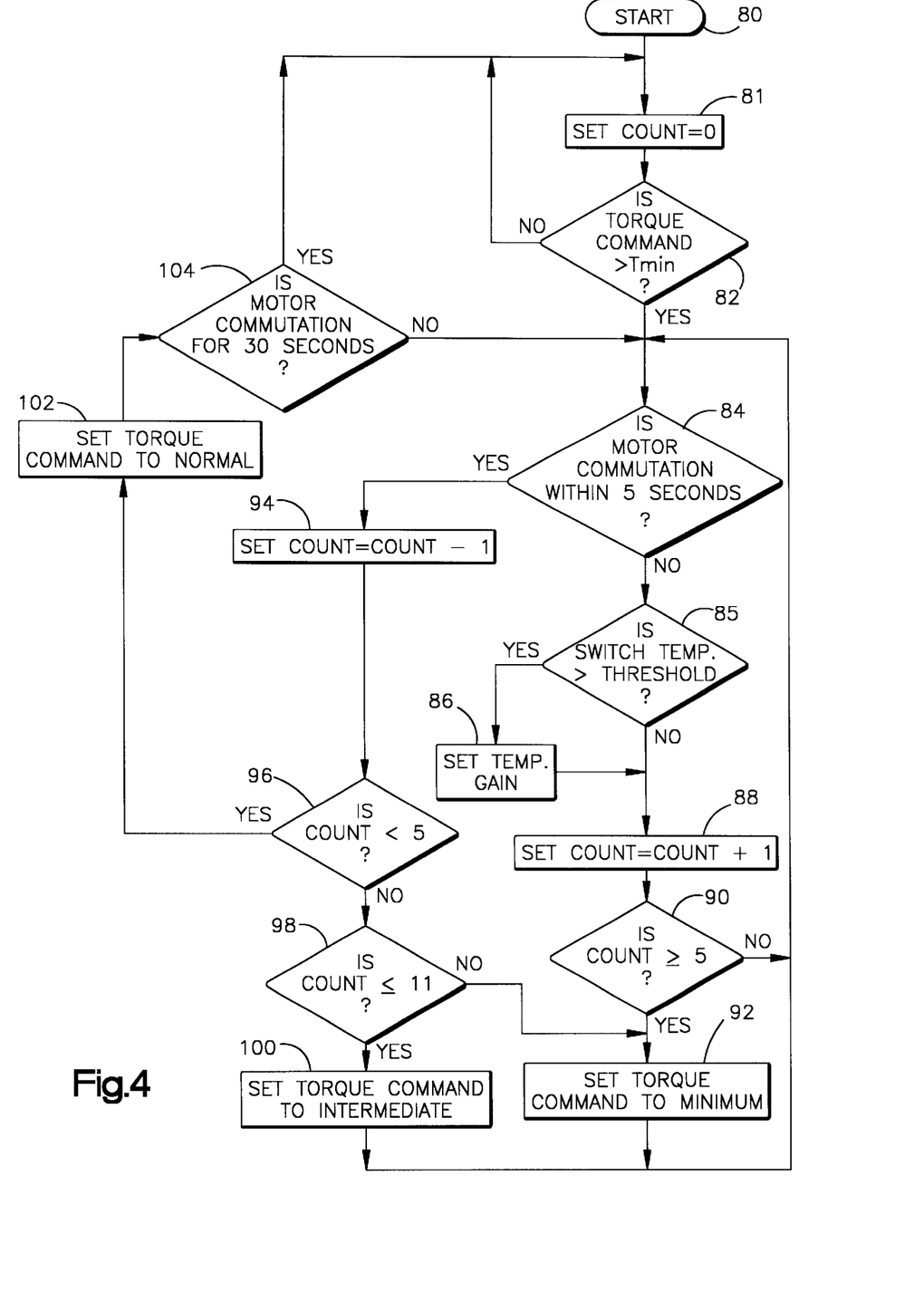
FIG. 4 is a flowchart showing a stall detection process for use with the system of FIG. 1.

FIG. 4 illustrates a preferred control process executed by the stall detector 70 to detect a motor stall condition. Preferably, the functions of the torque command circuit 46, the drive control circuit 54, the stall detector 70, the commutation sensor 74, and the adjustable gain amplifier 52 are all performed in a microcomputer. The drive control circuit 54 outputs a pulse width modulated drive signal to control the power switches 56. The adjustable gain amplifier 52 outputs a digital signal having a value that will control the PWM signal. When no stall condition is present, the PWM signal is functionally related to only the torque command signal when the gain amplifier has a unity gain. The stall detector 70 does not lower the gain value of amplifier 52 until a stall condition, i.e., a torque command and no motor commutation, is detected or, as stated herein, base on elevated temperature of the power switches 56.

In step 80, the process starts and internal memories, flags, initial conditions, etc., are set to initial values. The process then proceeds to step 81 where an internal counter is initialized to zero. From step 81, the process goes to step 82. In step 82, it is determined whether the value of the torque command signal 48 is greater than a predetermined minimum threshold value $T_{min}$. If the determination in step 82 is negative, the process loops back to step 81. In this way, the remaining steps of the process are executed only when the value of the torque command signal exceeds the minimum threshold value $T_{min}$.

When the determination in step 82 is affirmative, the process proceeds to step 84. In step 84, it is determined whether the commutation sensor 74 indicates that the electric assist motor 26 has been commutating within the last 5 seconds. If the determination in step 86 is negative, thereby indicating a possible stall condition, the process proceeds to step 85.

In step 85, a determination is made whether the temperature of the switches 56 is greater than or equal the first predetermined temperature threshold, e.g., about 123° C. If the determination is affirmative, the process proceeds to step 86 where the temperature gain $G_{temp}$ is set. It will be appreciated that the switch temperature is monitored continuously throughout the process. The temperature gain $G_{temp}$ is set based upon the detected switch temperature and, in turn, is used to determine the overall gain value $G_{tot}$, as described above. After setting the temperature gain $G_{temp}$, the process proceeds to step 88. In the event that the determination in step 85 is negative, the process also advances to step 88, but the temperature gain $G_{temp}$ is at unity gain. In this situation, power reduction to the motor 26 is based upon the severity of the detected stall condition, as $G_{temp}=1$. Therefore, the temperature gain reduction function occurs only when the switch temperature exceeds a predetermined threshold value and a stall condition is detected.

In step 88, a no commutation counter is incremented by one and the process proceeds to step 90. Initially, the no commutation counter was set to a zero value in step 82. The counter, which is internal to a microcomputer controller, can be incremented up or down, but can not go below zero.

In step 90, a determination is made as to whether the count of the no commutation counter is greater than or equal to five. If the determination in step 90 is negative, that is, if there has been motor commutation within the last 25 seconds, the process loops back to step 84.

If the determination in step 90 is affirmative, that is, there has been no motor commutation within the last 25 seconds, then the process proceeds to step 92. In step 92, the gain of the adjustable gain amplifier 52 is set at the minimum gain level ($G_{temp}*G_{min}$) to maximize protection of the motor 26 and switches 56. From step 92, the process loops back to step 84.

The current is reduced in step 92 only after the count determined in step 90 is greater than or equal to 5. Each time the motor 26 has not commutated within a 5 second period, the counter in step 88 is incremented. Thus, when the torque command signal 48 exceeds the threshold $T_{min}$ and the motor 26 has not commutated within 25 seconds, the stall detector 70 determines that a motor stall condition exists and reduces the gain of the amplifier 52 to a minimum to protect the motor 26 and switches 56.

When the determination in step 84 is affirmative, that is, when the commutation sensor 74 indicates that the motor has commutated within the last 5 second period, the process goes to step 94. In step 94, the no commutation counter is decremented by one. As mentioned, the counter value can not be less than zero, i.e., if the counter is at zero, no further decrementing occurs. From step 94, the process proceeds to step 96. In step 96, it is determined whether the count of the counter is less than 5.

If the determination in step 96 is negative, that is, when the count is not less than 5, the process proceeds to step 98. In step 98, a determination is made whether the count is less than or equal to 11. When the determination in step 98 is negative, the process proceeds to step 92 and the gain of the amplifier 52 is maintained at the minimum value to keep the motor current at a minimum value. If the count is less than or equal to 11, however, the determination in step 98 is affirmative and the process proceeds to step 100. In step 100, the gain of the amplifier 52 is set to the intermediate gain level $G_{int}$ multiplied by the determined $G_{temp}$ value to result in an amplifier gain of $G_{int}*G_{temp}$. From step 100, the process loops back to step 84.

The effect of steps 96 and 98 is that after a stall is detected and the gain of the amplifier 52 is reduced to a minimum, the amplifier gain is eventually set or raised to an intermediate level after a sufficient period of time of motor commutation. The gain of the amplifier 52 can remain at the intermediate value for 35 seconds, which corresponds to the counter being decremented from 11 to 5.

If the determination in step 96 is affirmative, that is, when the no commutation count is less than 5, the process proceeds from step 96 to step 102. In step 102, the gain of the adjustable gain amplifier 52 is set to the normal gain level $G_{norm}$ times the corresponding $G_{temp}$, i.e., $G_{norm}*G_{temp}$. From step 102, the process proceeds to step 104. In step 104, it is determined whether the electric assist motor 26 has been commutating for 30 seconds. If it is determined that the motor 26 has been commutating for 30 seconds, it is assumed that the motor 26 and switches 56 are at or below an acceptable temperature value. If the determination in step 104 is affirmative, the process loops back to step 81. If the determination in step 104 is negative, it is assumed that the motor 26 and switches 56 may still be at an elevated temperature and so the process returns to step 84.

This control arrangement does not necessarily fully remove steering assist, but controls the assist level to protect the motor 26 and switches 56. While a no commutation event increases the no commutation count value, a resumption of commutation reduces the value of the count so that at some point in time, normal assist resumes. It also will be appreciated that the stall detector 70 preferably further reduces the steering assist when the switch temperature exceeds a minimum temperature threshold, such as about 123° C. In such circumstances, the $G_{tot}$ becomes a product of $G_{temp}$ and the corresponding gain based upon the motor commutations, i.e. $G_{st}$.

The temperature thresholds, time durations, and count values used in the control process shown in FIG. 4 may be varied or tailored for a specific vehicle type and motor arrangement. The time durations and count values are selected for explanation purposes only and are not meant to limit the present invention.

Figure 5:
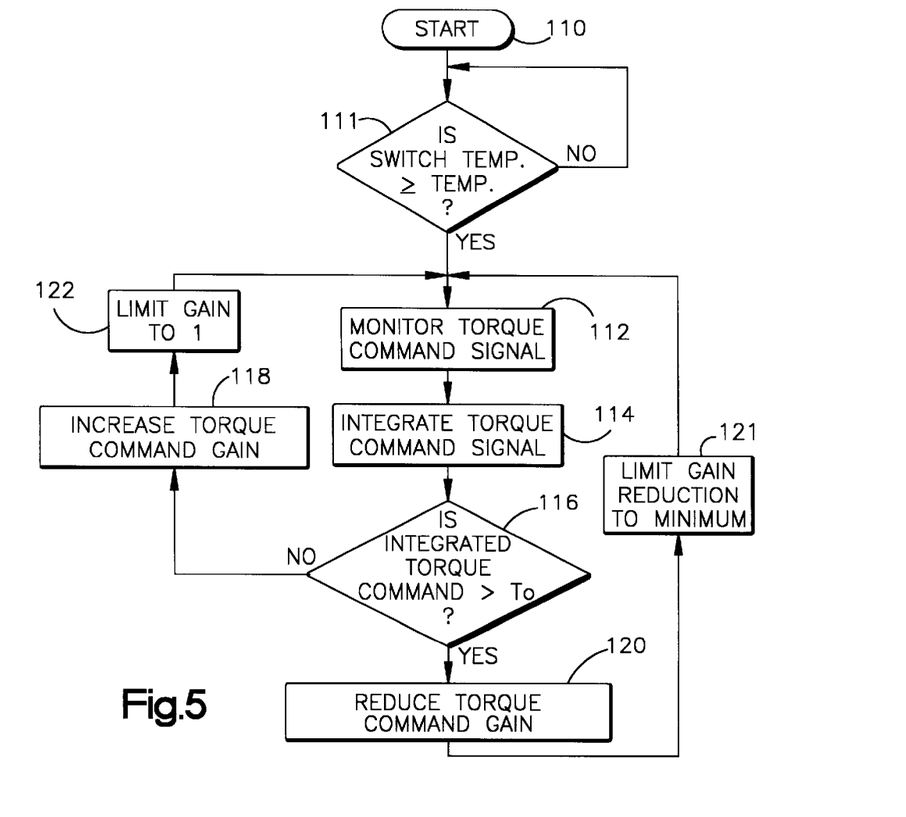
FIG. 5 is a flowchart showing an alternative stall detection process for use with the system of FIG. 1.

An alternative control process for the stall detector 70 is shown in the flowchart of FIG. 5. The control process begins in step 110 where initial parameters are set including setting the initial gain value for the torque command signal equal to 1. The process then proceeds to step 111 where it is determined whether the temperature of the switches 56 is greater than or equal to the threshold temperature, suitably about 123° C. If the sensed temperature of the switches 56 does not reach this threshold level, the stall detector 70 will not be enabled.

Provided that the temperature of power switches 56 is sensed to be greater than or equal to the threshold value, the process continues to step 112 where the torque command signal 48 is monitored by the stall detector 70. From step 112, the process proceeds to step 114 where the monitored torque command signal 48 is integrated by a leaky stall detect integrator. To achieve leaky integration, a relatively small constant value is subtracted from the integration value each time the process goes through a loop, i.e., each time step 114 is performed.

The process then proceeds to step 116. In step 116, a determination is made whether the integrated torque command signal is greater than a threshold value $T_o$. If the determination in step 116 is negative, the process proceeds to step 118 where the gain of the adjustable gain amplifier 52 is increased. The process then proceeds to step 122 where the torque command gain is limited to a value of 1. The process then loops back to step 112.

When the determination in step 116 is affirmative, the process determines that the motor 26 is stalled. The process then proceeds to step 120. In step 120, the stall detector 70 reduces the gain of the adjustable gain amplifier 52. It will be appreciated that, as in the previously described embodiment, the gain will be functionally related to the temperature of the power switches 56, preferably including the $G_{temp}$ value described above.

The process then proceeds to step 121 where the gain reduction is limited to a predetermined minimum value. From step 121, the process loops back to step 112. The control process increases the amplifier gain over time to a normal level only when the integrated torque command remains less than the threshold $T_o$ as a result of the integrator leakage over a sufficient time period. It should be appreciated by those skilled in the art that the rate of increase of the torque command gain in step 118 and the rate of decrease of torque command gain in step 120 are independent of each other. Also, the rates may be linear or non-linear.

Those skilled in the art should also appreciate that the embodiment of FIG. 5 detects over-use of the electric assist steering system. Such over-use occurs, for example, when high motor torques are commanded for an extended period of time even though the motor is moving. Those skilled in the art will appreciate that a stall condition may be an over-use condition, such as where the temperature of the power switches 56 exceed the threshold temperature.

The control processes shown in FIGS. 4 and 5 could be implemented in a single stall and over-use detector 70. In such an implementation, the stall and over-use detector 70 would determine that a stall or over-use condition exists when either or both of the two processes indicates the existence of a stall or over-use condition. In effect, a stall condition is detected as the result of a torque command being greater than a threshold value and no motor commutation for a predetermined time period and an over-use condition is the result of the integrated torque command exceeding a threshold value.

It is desirable to include self-diagnostic features in the drive control circuit to insure proper operation of the assist arrangement. Such a diagnostic arrangement for an electric assist steering system is fully described in U.S. Pat. No. 4,660,671, to Behr et al., and assigned to TRW Inc., which is hereby incorporated herein by reference.

From the above description of the invention, those skilled in the art will perceive improvements, changes and modifications. For example, the reduction of electric power, as well as its subsequent increase, has been described as an incremental stepping function over time. It will be appreciated that, alternatively, the control system might provide a time-based ramping function to increase and decrease the electric power. The ramping function may be implemented either as an analog or digital control. These and other similar improvements, changes and modifications within the skill of the art are intended to be covered by the appended claims.

Having described the invention, the following is claimed:

1. An apparatus for controlling an electric assist motor in a vehicle steering system, said apparatus comprising:

a switching circuit for connecting electrical power to the electric assist motor of the vehicle steering system, said switching circuit having a temperature condition;

a temperature sensor associated with said switching circuit for providing an output signal having a value indicative of a sensed temperature condition of said switching circuit;

a stall detector for determining when the electric assist motor is in a stalled condition, said stall detector being responsive to the output signal of said temperature sensor, said stall detector being effective to reduce power of the electric assist motor via a torque command to a first level in response to a determined stall condition of the electric assist motor and upon sensing that the temperature condition of said switching circuit is less than a first temperature threshold and being effective to reduce power of the electric assist motor via the torque command to a second level in response to a determined stall condition of the electric assist motor and upon sensing that the temperature condition of said switching circuit is greater than or equal to the first temperature threshold, the second level being different from the first level.

2. The apparatus of claim 1 wherein said stall detector is effective to reduce power to the motor via the torque command to a third level, which is different from the first and second levels, in response to a determined stall condition of the electric assist motor and upon sensing that the temperature condition of said switching circuit is greater than or equal to a second temperature threshold.

3. The apparatus of claim 1 wherein said vehicle steering system comprises a torque command circuit for providing the torque command having a value to said stall detector in response to a steering torque applied to a steering wheel of the vehicle.

4. The apparatus of claim 3 further including means for adjusting the value of the torque command in response to a signal from said stall detector.

5. The apparatus of claim 4 wherein said stall detector is operable to control said means for adjusting the value of the torque command by a first value in response to a determined stall condition of the electric assist motor and upon sensing that the temperature condition of said switching circuit is greater than the first temperature threshold but less than a second temperature threshold.

6. The apparatus of claim 5 wherein said stall detector is operable to control said means for adjusting the value of the torque command by a second value, which is different from the first value, in response to a determined stall condition of the electric assist motor and upon sensing that the temperature condition of said switching circuit is greater than or equal to the second temperature threshold.

7. The apparatus of claim 3 further comprising a commutation sensor for sensing commutation of the electric motor and for providing to said stall detector a commutation signal indicative of the commutation of the electric motor, said stall detector determining the occurrence of the stall condition in response to the torque command and the commutation signal.

8. The apparatus of claim 1 wherein said stall detector is enabled upon sensing the temperature condition of said switching circuit is greater than or equal to an enable temperature threshold and disabled upon determining the temperature condition of said switching circuit is less than the enable temperature threshold.

9. A vehicle steering system comprising:

a steering member operable to steer steerable wheels of a vehicle;

a torque sensor for sensing an applied steering torque and for providing an applied steering torque signal indicative of the applied steering torque;

an electric assist motor operatively connected with said steering member to provide steering assist when energized;

a power switching circuit electrically connected to said electric assist motor for providing electric power to energize said electric assist motor in response to a torque command signal;

a temperature sensor coupled to said power switching circuit and operable to provide an output signal having a value indicative of the temperature of said switching circuit;

a controller for monitoring the applied steering torque signal and for providing the torque command signal in response to the applied steering torque signal, said electric assist motor being energized in response to the torque command signal; and a stall detector responsive to the output signal of said temperature sensor and operable to detect a stall condition of the electric assist motor, said stall detector being operable to reduce power of the electric assist motor by adjusting the torque command signal to a first level upon (i) determining the existence of a stall condition and (ii) sensing the temperature condition of the switching circuit is greater than a first temperature threshold, said stall detector being effective to reduce power of the electric assist motor by adjusting the torque command signal to a second level, which is different from the first level, upon (i) determining the existence of a stall condition and (ii) sensing the temperature condition of the switching circuit is greater than or equal to a second temperature threshold.

10. The apparatus of claim 9 further comprising a commutation sensor for sensing commutation of said electric assist motor and for providing a commutation signal indicative of the commutation of said electric assist motor, said stall detector detecting the occurrence of the stall condition of the electric assist motor in response to the torque command signal and the motor commutation signal.

11. The apparatus of claim 10 wherein said stall detector further includes means for providing the stall detection signal when both (i) the torque command signal exceeds a predetermined command threshold and (ii) the commutation sensor signal indicates said electric assist motor is not commutating.

12. The apparatus of claim 9 wherein said stall detector includes means for adjusting the value of the torque command signal by a first value upon determining the existence of a stall condition and sensing the temperature of said power switching circuit is greater than or equal to the first temperature threshold.

13. The apparatus of claim 12 wherein said stall detector is operable to control said means for adjusting the value of the torque command signal by a second value, which is different from the first value, upon determining the existence of a stall condition and sensing that the temperature of said power switching circuit is greater than or equal to the second temperature threshold.

14. The apparatus of claim 9 wherein said stall detector is enabled upon sensing the temperature of said power switching circuit is greater than or equal to the first temperature threshold and disabled upon sensing the temperature of said power switching circuit is less than the first temperature threshold.

15. A method for detecting a stall condition of an electric assist motor in a vehicle steering system, said method comprising the steps of:

provC a switching circuit;

sensing temperature of the switching circuit;

providing an output signal having a value indicative of the sensed temperature of the switching circuit;

determining if the electric assist motor is in a stall condition;

controlling the switching circuit to reduce power to the electric assist motor via a torque command to a first level in response to a determined stall condition of the electric assist motor and upon sensing that the temperature of the switching circuit is greater than a first temperature threshold; and controlling the switching circuit to reduce power to the electric assist motor via the torque command to a second level which is different from the first level in response to a determined stall condition of the electric assist motor and upon sensing that the temperature of the switching circuit is greater than a second temperature threshold.

16. The method of claim 15 further including the steps of sensing an applied steering torque and sensing motor commutation and providing a stall detection signal in response to the sensed applied steering torque and the sensed motor commutation.

17. An apparatus for controlling an electric assist motor in a vehicle steering system, said apparatus comprising:

a switching circuit for providing electric power to the electric motor of the vehicle steering system;

a temperature sensor coupled with said switching circuit for sensing temperature of said switching circuit and providing an output signal having a value indicative of the sensed temperature of said switching circuit; and a stall detector for detecting a stall condition of the electric assist motor, said stall detector being responsive to the output signal of said temperature sensor so as to be (i) enabled to reduce power to the electric assist motor via a torque command when the sensed temperature of said switching circuit is greater than or equal to the first temperature threshold and a stall condition of the electric assist motor is detected by the stall detector and (ii) disabled when the sensed temperature of said switching circuit is less than the first temperature threshold.

18. A method for detecting a stall condition of an electric assist motor, which is in a vehicle steering system, said method comprising the steps of:

providing electric power to the electric assist motor of the vehicle steering system through a switching circuit;

sensing temperature of the switching circuit;

upon determining that the temperature of the switching circuit is greater than or equal to a first temperature threshold, determining whether the electric assist motor is in a stalled condition; and in response to a determined stalled condition, reducing power to the electric motor via a torque command through the switching circuit.

* * * * *